Feb. 28, 1933.  C. F. DENNEY  1,899,081
OIL FRACTIONATING
Filed July 3, 1930
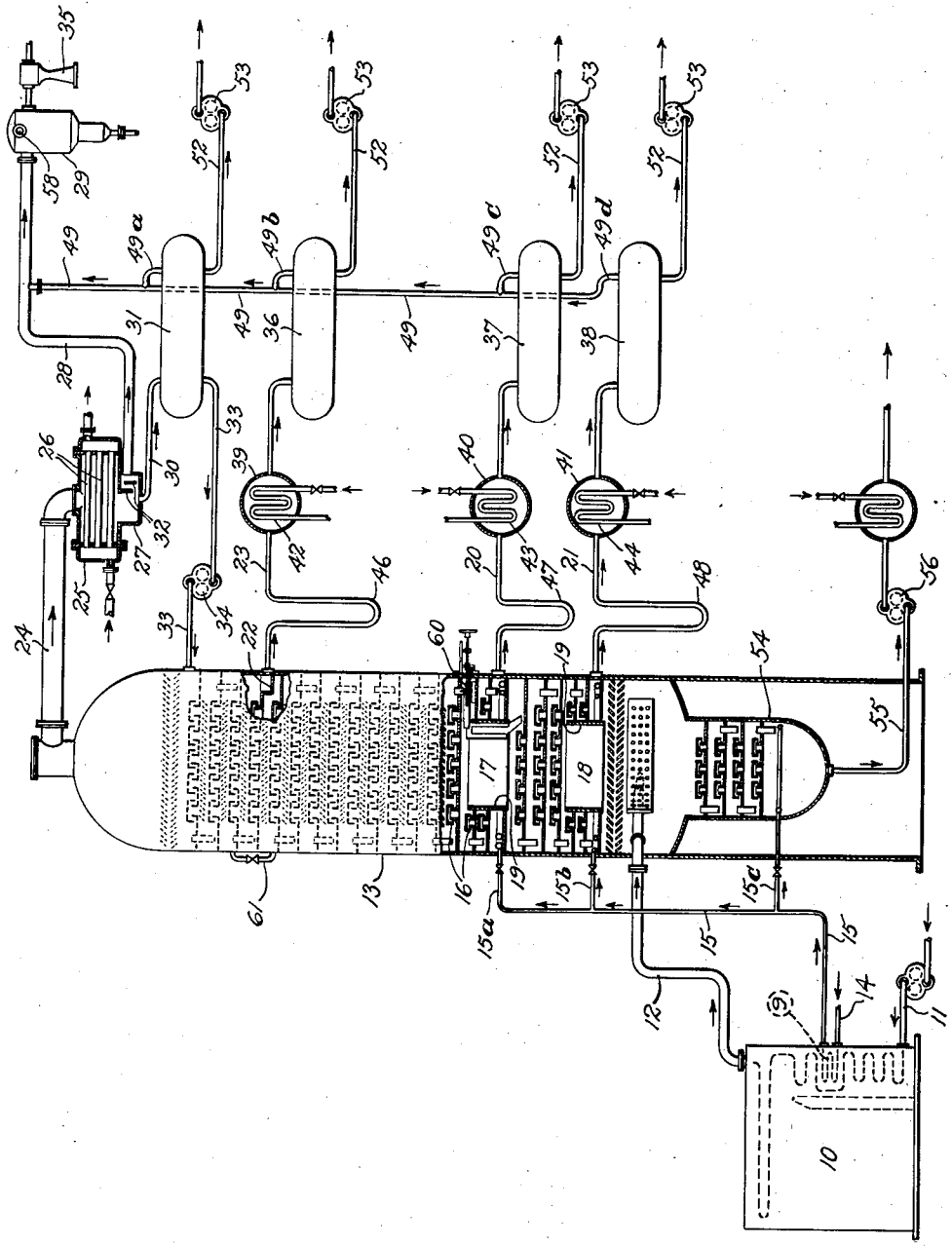
INVENTOR
Courtlandt F. Denney
BY
William G. McKnight
his ATTORNEY Patented Feb. 28, 1933

1,899,081

UNITED STATES PATENT OFFICE

COURTLANDT F. DENNEY, OF NEW YORK, N. Y., ASSIGNOR TO FOSTER WHEELER CORPORATION, OF NEW YORK, N. Y., A CORPORATION OF NEW YORK

OIL FRACTIONATING

Application filed July 3, 1930. Serial No. 465,546.

My invention relates to fractionation of oil and more particularly to vacuum fractionating towers.

Among the objects of the invention are to provide separate means for condensing oil vapors and steam in a vapor mixture leaving a fractionating tower; to produce a greater efficiency in condensation of vapors for producing a vacuum in a fractionating tower; to provide a balanced system wherein variations in condensing effect are proportionately distributed; to provide a system for fractionating oil wherein each side stream is brought to specifications at the same pressure as the pressure in the tower and all side streams are brought to specifications before leaving the tower; to prevent the possibility of thermal decomposition of fractionated products by confining certain operations to small bodies of liquid and cooling the liquid upon withdrawal from the tower before being collected in run-down tanks; to produce a system in which there is a reduction of the time when hot oil of high specific gravity is under high temperature in order to avoid cracking and decomposition; and to provide unrestricted gravity flow from a fractionating tower to vacuum run-down tanks.

In condensing an oil vapor with steam, separation of the two products is comparatively simple provided there is a relatively large difference between the specific gravity of the condensed oil and the water formed by condensing the steam. If, however, a relatively heavy oil vapor and the steam are condensed together and the specific gravity of the oil approaches the specific gravity of water, separation cannot be readily accomplished, and there is a likelihood of forming an emulsion between the oil and water, which is undesirable.

If the reflux pumped back into the tower contains any appreciable amount of water, the operation of the tower will be subject to undesirable variations both in temperature and in pressure. It therefore is a purpose of my invention to cool the over-head product to a point where all of the oil vapor or substantially all of the oil vapor is condensed and at a temperature sufficiently high to leave the steam wholly or substantially wholly in the vapor state, thereby readily effecting maximum separation of the oil and steam before pumping part of the condensed oil vapor back into the fractionating column for the purpose of internal condensation while at the same time providing a commercially water free oil product.

Other objects of the invention will become apparent as the description proceeds.

The manner in which I attain these objects will become apparent from a consideration of a system embodying the invention as disclosed in the accompanying drawing.

Referring to the drawing:

Reference character 10 designates a tube still or heater which may be of the usual bridge wall type or which may be of any of various types. In the heater, oil admitted through conduit 11 is heated and in part vaporizes. The heated product of this heating step consists of vapor and liquid oil, which passes through conduit 12 and into a fractionating tower 13.

Steam is supplied to a steam heating coil 9 within the heater setting by means of conduit 14 and superheated steam passes through conduit 15 into the tower at various points.

The tower comprises the usual bubble trays 16 having bubble caps through which vapor passes upwardly, the caps having edges extending into liquid held on the trays. One or more stripping sections are provided, two being shown at 17 and 18. The stripping sections are provided between central passage-way members 19 and the outer shell of the fractionating tower. A side stream conduit 20 is connected to a lower portion of a stripping section 17 and serves to conduct liquid oil therefrom as a side stream. A side stream conduit 21 is connected to a lower part of stripping section 18 and serves to conduct liquid oil therefrom as a side stream. Steam is supplied through conduit 15 and branch conduits 15a and 15b to the stripping sections 17 and 18 respectively.

The side streams are not necessarily all removed from stripping section pockets as 17 and 18, but may be withdrawn, for example, from a pocket such as 22 associated with a bubble tray. A side stream conduit 23 serves to conduct a side stream from the pocket 22.

Conduit 24 is connected to the top of the tower and conducts a mixture of oil vapor and steam from the top of the tower of the condenser 25. Condenser 25 is a surface condenser having separated spaces through one of which the vapor flows which is derived from the tower, and through the other of which cooling water flows. The cooling means containing cooling water is indicated at 26. A well 27 is associated with the lower part of condenser 25. Connected to the side of well 27 is a vapor conduit 28 which conducts steam from well 27 to a barometric condenser 29. At a lower point in well 27, and preferably the lowest point thereof, a conduit 30 is connected which is a liquid conduit and conveys oil condensed in condenser 25 by gravity to a vacuum run-down tank 31. A baffle 32 is provided to prevent oil from being carried along with the steam into conduit 28. A number of baffles may be used in this connection, affording a tortuous path for the steam in its exit from the condenser 25 and well 27. Connected to the bottom of vacuum run-down tank 31 is a reflux conduit 33. A reflux pump 34 is interposed in conduit 33 and serves to pump liquid oil through conduit 33 back into the top of the tower to flow downwardly over the trays therein and provide a cooling medium for causing condensation within the tower. A steam jet vacuum pump 35, of known design, is connected to barometric condenser 29 to withdraw non-condensible vapors therefrom and maintain or assist in maintaining the vacuum.

Vacuum run-down tanks 36, 37 and 38 are connected to conduits 23, 20 and 21 respectively. Interposed in conduits 23, 20 and 21 are coolers 39, 40 and 41 respectively, suitably cooled by cooling pipes adapted for flow of cooling water or oil and designated by reference characters 42, 43 and 44 respectively. Suitable means, such as hand valves, are provided for controlling the flow of water through any of the cooling members 26, 42, 43 and 44. Liquid loops 46, 47 and 48 are provided in conduits 23, 20 and 21 respectively which serve to permit pressure variations and insure the presence of liquid. The height of these loops is determined by operating conditions.

A balance conduit or balance line 49 is connected to conduit 28 and by branch conduits 49a, 49b, 49c and 49d with the upper parts of vacuum run-down tanks 31, 36, 37 and 38 respectively. This produces a direct gas communication to each of the vacuum run-down tanks and acts as a pressure equalizing conduit whereby variations in pressure are transmitted in proportion to the various parts of the system.

From the bottom of each vacuum run-down tank oil is conducted through a pipe 52 and pump 53 to storage or other point. In the lower part of the tower 13 is provided a restricted section 54 containing bubble trays. Steam is introduced into this section through branch conduit 15c. The reduction of diameter of the tower below the inlet reduces the time that the hot oil is under high temperature, which tends to reduce cracking and thermal decomposition. Bottoms are withdrawn from the tower through conduit 55 and pump 56.

There is an unrestricted gravity flow from the side stream points of the tower to the vacuum run-down tanks. Division of the down-flowing liquid takes place inside the tower and the oil collected in the tower passes through the side stream conduits and to the vacuum run-down tanks without being held at high temperature for any appreciable length of time before cooling. For dividing the oil stream in the tower weir elements may be used as disclosed in the application Serial No. 106,866 of Primrose and Swanson Patent No. 1,893,906 granted January 10, 1933, and as indicated at 60 or by-passes may be used as indicated at 61.

In operation, water is supplied to the barometric condenser as at 58. The water is in direct contact in the barometric condenser with the steam passing through conduit 28 and condenses the steam. Steam is supplied to the steam jet vacuum pump 35 and this steam jet vacuum pump exhausts non-condensible vapors (and, of course, some steam) from the barometric condenser. The condensation in the condenser and the removal of gas by the vacuum pump serves to maintain a high vacuum, for example, 26 to 28 inches. This vacuum is communicated back through conduit 28 and through the surface condenser 25 to the fractionating tower and through transfer line 12 to the outlet of heater 10. It will be seen that a path of flow for gaseous products from the top of the tower is provided by way of conduits 24 and 28 and condensers 25 and 29, which path has a decreasing pressure gradient from the inlet end at the tower to the terminal end at the jet pump 35. As above stated, a mixture of steam and oil vapor is drawn from the top of the tower through conduit 24. The oil, but not the steam, is condensed in condenser 25. This condenser is maintained at approximately 150° F. by suitably regulating the flow of cooling water. At this temperature the oil is condensed and collects in the well 27 passing therefrom through conduit 30 to vacuum run-down tank 31. At the temperature of 150° F. and the low absolute pressure prevailing (it being understood that the figures are used by way of example only), the steam is still in a vaporous state and passes into the barometric condenser 29. With this method of operation, the condensing surface of the surface condenser 25 is reduced to a minimum and the pressure drop through the barometric condenser is also reduced to a minimum, thereby causing a higher vacuum at the top of the tower than would be obtained if the surface condenser 25 were made sufficiently large to cool and condense both the steam and the oil. While I prefer a barometric condenser because the combination of the surface and barometric condensers gives better operation than two surface condensers, I may use a surface condenser instead of the barometric.

Since a barometric condenser is used for condensing the steam, it is desirable that as little oil as possible pass to the barometric condenser, wherefore the baffle or baffles 32 are used to hinder oil vapor from passing along with the steam. Also in order not to have oil pass to the barometric condenser, the process should use an oil having a minimum boiling point so high that it will all condense in the condenser 25.

Considering the system as a whole, it will be noted that every part of the equipment is responsive to pressure fluctuations of the vacuum producing apparatus. The system is responsive with equalized effect to both variations in the cooling of the barometric condenser and the steam supplied to the steam jet vacuum pump 35. The vacuum is transmitted in parallel through conduits 24 and 28 on the one hand and through the transfer line 49 on the other hand. This gives an improved operation at the point of flash in the tower where the oil from the heater is supplied thereto. The changes in pressure affect every part of the equipment and may be readily compensated for by varying the quantity of steam introduced into the tower to obtain a constant partial pressure of the oil vapor at the point of entry of the oil into the tower, regardless of variations in the condensing effect. This balance of pressure permits smooth operation with minimum fluctuations in the quality of the final products. This compensation may be accomplished by controlling a hand valve in the branch pipe 15c supplying steam to the base of the tower. To illustrate, assume that in the summer time the temperature of the cooling water is 90° F. whereas in the winter time it is 60° F. Due to the relation between temperature and pressure of water vapor, the maximum vacuum obtainable in the summer time will be less than in the winter time. Consequently more steam is introduced in the summer time so that, in accordance with Dalton's law of partial pressures, the effective pressure, that is, the partial pressure, of the oil at the point of oil entry into the tower is lower relative to the total or indicated pressure and so that the effective pressure for condensation purposes is equalized independently of the season.

What I claim is:

1. Fractionating apparatus comprising a fractionating tower, a plurality of stripping sections in said tower, means to supply steam to said tower, a surface condenser, a barometric condenser, vacuum producing means, a low pressure vacuum run-down tank, a conduit connected at a low point to said surface condenser and to said tank for flowing oil from the surface condenser to the tank, a conduit connected to said surface condenser at a higher level and to said barometric condenser for conducting steam from said surface condenser to said barometric condenser, a plurality of side stream run-down tanks, side stream conduits connecting the tower with the side stream run-down tanks, and a balance line connecting the upper parts of the run-down tanks with the barometric condenser.

2. Fractionating apparatus comprising a fractionating tower, means for introducing oil and steam to the tower, means providing a path of flow for oil vapor and steam from the top of the tower, vacuum producing means including a condenser for drawing vapors through said path of flow, a surface condenser interposed in said path of flow between the tower and said first mentioned condenser, said first mentioned condenser being adapted to condense steam drawn from the tower and the surface condenser being adapted to condense only the oil vapor passing therethrough, conduits for conducting liquid side streams from the tower, run-down tanks for collecting said side streams into separate liquid bodies outside the tower, and conduits for connecting the upper portions of each of said run-down tanks with said path of flow at a point intermediate said condensers.

In testimony whereof I have affixed my signature.

COURTLANDT F. DENNEY.